April 2, 1968  K. Y. JABBAR ET AL  3,376,548
WARNING SYSTEM FOR INDICATING OPERATION OF
VEHICULAR ELECTRICAL SYSTEM
Filed April 19, 1965

Inventors
Kamil Y. Jabbar
Richard T. Race
By Mueller, Aichele & Rauner
Attys

United States Patent Office 3,376,548
Patented Apr. 2, 1968

3,376,548
WARNING SYSTEM FOR INDICATING OPERATION OF VEHICULAR ELECTRICAL SYSTEM
Kamil Y. Jabbar and Richard T. Race, Chicago, Ill., assignors to Motorola, Inc., Franklin Park, Ill., a corporation of Illinois
Filed Apr. 19, 1965, Ser. No. 449,211
9 Claims. (Cl. 340—52)

ABSTRACT OF THE DISCLOSURE

Warning system for vehicular electrical system having ignition switch, light switch, oil pressure switch and turn indicator switch, including transistor oscillator connected to loudspeaker for providing an audible warning. The transistor is rendered conductive when the light switch is closed and the ignition switch is open, and when the oil pressure switch is closed with either the light switch or the ignition switch closed. The transistor is also rendered conductive by the turn indicator switch at a predetermined time after the turn indicator switch has been operated.

---

This invention relates to vehicular electrical systems and more particularly to an audible warning system for use in a vehicular electrical system.

Many vehicles incorporate indicating devices for visually indicating the operating condition of various parts of the vehicle. Thus, a warning light may be provided to indicate to the operator of the vehicle that the oil pressure has fallen below a given level, or that the turn indicator switch is closed. Unless the operator of the vehicle is particularly attentive, such visual indications may be inadequate to attract his attention. It may be desirable, therefore, to provide a more positive warning to the operator. This can be especially true in the case of the headlight switch being inadvertently left on after the ignition switch is turned off, and the operator leaves the vehicle. If the operator does not notice this condition in time, the resultant drain on the battery may make it difficult or impossible to start the engine of the vehicle.

Accordingly, it is an object of this invention to provide a vehicle warning system which provides an audible warning when there is some condition which the operator should be aware of.

A further object is to provide an audible warning in a vehicle when the vehicle oil pressure falls below a given level or when the ignition switch is open with the light switch closed.

It is another object of the invention to provide a vehicle warning system which provides an audible warning that the turn indicator switch is closed only after such switch has been closed for a given length of time.

Still another object of the invention is to provide a warning system for providing an audible warning when the vehicle oil pressure falls below a given level, or when the ignition switch is open with the light switch closed, or when the turn indicator switch is closed, and which system is low in cost, simple of construction and economical of operation.

A feature of the invention is the provision of a warning system including a normally open oil pressure switch operable to a closed position in response to opening of the ignition switch and in response to the vehicle oil pressure falling below a given level, which oil pressure switch is closable to energize a warning device when either the ignition switch or the light switch is closed.

Another feature of the invention is the provision, in such a warning system, of a circuit connecting the turn indicator switch in series with the ignition switch and energizable when both such switches are closed to operate the audible warning device.

Still another feature of the invention is the provision of an audible warning device energizable when the turn indicator switch and the ignition switch are both closed and which includes a resistor-capacitor energy storage network for delaying the operation of the warning device for a given length of time.

Figure 1:
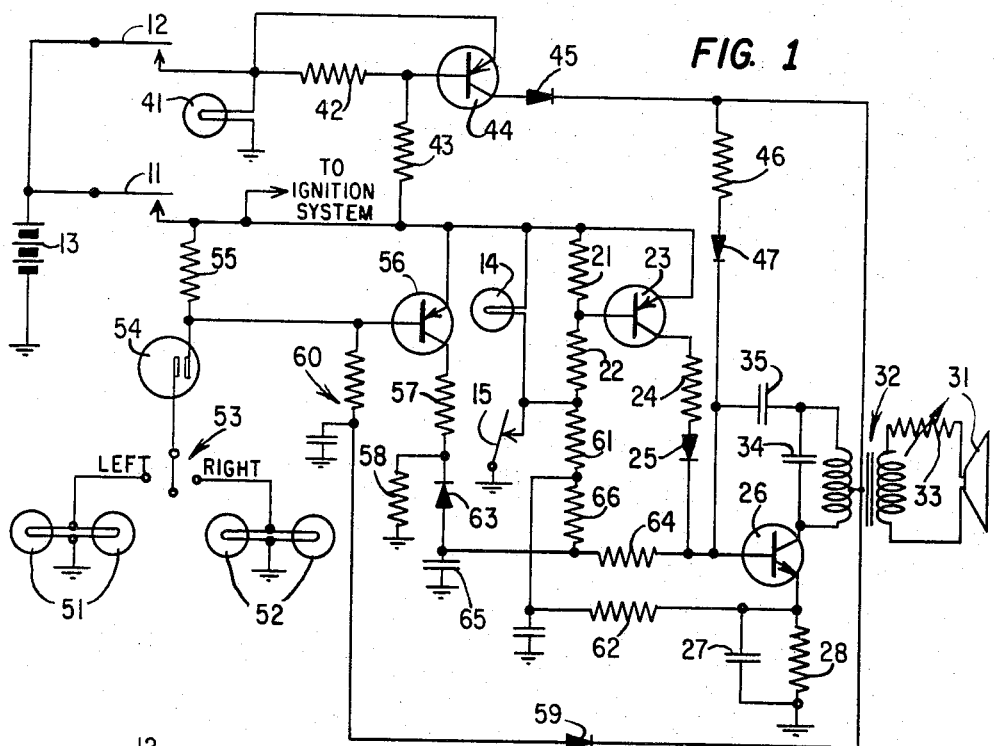
Figure 2:
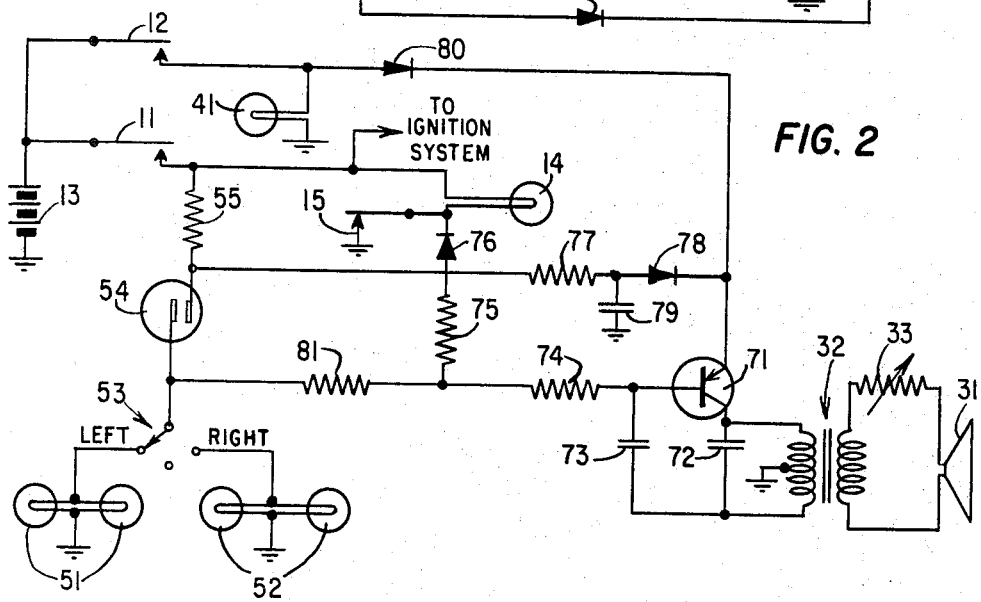

In the drawing:
FIG. 1 is a schematic diagram of a warning system constructed in accordance with the invention; and,
FIG. 2 is a schematic diagram of an alternative embodiment of the invention.

The invention comprises a warning system for use in a vehicular electrical system having an ignition switch and a light switch, each connected to a source of potential. The system provides an audible warning when the vehicle oil pressure falls below a given level, and when the ignition switch is open with the light switch closed. The warning system includes a normally open oil pressure switch operable to a closed position in response to opening of the ignition switch and in the event the vehicle oil pressure falls below the given level. A transistor driven audible warning device is energized when the transistor is forward biased to provide the audible warning. A bias circuit is connected to the transistor for rendering the same conductive upon the application of current to the bias circuit. Provision is made for connecting the bias circuit in series with the oil pressure switch and each of the ignition switch and the light switch across a source of potential. This applies current to the bias circuit when the oil pressure switch is closed and either the ignition switch or the light switch is closed.

The warning system may also include provision for providing an audible warning when the turn indicator switch has been closed for a given length of time. Such a system incorporates a resistor series connected with the turn indicator switch and with a further transistor connected across the resistor to be forward biased thereby when the ignition switch and the turn switch are both closed. The system further includes a resistance-capacitance energy storage network connected to the output of the further transistor to delay the application of energy therefrom to the transistor driven warning device for a given length of time.

In the system shown in FIG. 1, provision is made for an audible warning that the vehicle oil pressure has fallen below a given level, that the ignition switch is open with the light switch closed, and that the turn indicator switch has been closed for a given length of time. The system includes an ignition switch 11 and a light switch 12, both connected to a storage battery 13. Ignition switch 11 will, of course, control the application of current to the ignition system of the vehicle, and such circuitry, being well known in the art, is not shown in the drawing. An oil pressure indicator light 14 is series connected with an oil pressure switch 15 and the ignition switch 11, across storage battery 13. As is known in the art, oil pressure switch 15 will close when the oil pressure falls below a given level. This occurs when ignition switch 11 is open and the engine is not operating, and when the oil pressure is inadequate even though the engine is operating. At all other times, when the engine is operating and there is a predetermined oil pressure, oil pressure switch 15 will remain open. Thus oil pressure indicating light 14 will provide an indication of low oil pressure when ignition switch 11 is closed and oil pressure switch 15 is closed.

In addition to the visual warning of low oil pressure provided by bulb 14, aduible warning is also provided. Resistors 21 and 22 are series connected with each other across bulb 14. The base of PNP transistor 23 is connected to the junction between resistors 21 and 22. The emitter of transistor 23 is connected to ignition switch 11, and the collector of transistor 23 is connected through a resistor 24 and diode 25 to the base of transistor 26. Transistor 26 is an NPN transistor having its emitter grounded through capacitor 27 and resistor 28, and is connected to drive a speaker 31 through a transformer 32. Variable resistor 33 provides a volume control. The primary of transformer 32, together with capacitors 34 and 35, provide regenerative or oscillatory action in transistor 26 at an audio frequency to produce the desired audible tone for warning purposes.

It will be seen therefore, that closure of oil pressure switch 15, when ignition switch 11 is also closed, indicates that the oil pressure is too low by causing illumination of bulb 14. In addition to this, the drop in voltage across resistor 21 forward biases transistor 23 into conduction. The base of transistor 26 therefore becomes positive with respect to its emitter, forward biasing transistor 26 into conduction. The regenerative action produces oscillations at an audio frequency which are reproduced in speaker 31 to provide an audible warning that the oil pressure is too low.

In addition to providing an audible warning of low oil pressure, the system of FIG. 1 also provides an audible warning to the operator of the vehicle when he has left the light switch on after opening the ignition switch. The light circuit, such as the headlights and tail lights of the vehicle, is shown representatively by bulb 41 series connected with lightswitch 12 across battery 13. Resistors 42 and 43 are series connected with light switch 12, resistors 21 and 22, and oil pressure switch 15, across storage battery 13, thus forming a voltage divider network. A transistor 44 has its base connected to the junction between resistors 42 and 43 and has its emitter connected to the junction between light switch 12 and resistor 42. The collector of transistor 44 is connected through diode 45, resistor 46 and diode 47 to the base of transistor 26. Diode 45 is also connected to the center tap of the primary of transformer 32 to supply battery potential to the collector of transistor 26 when transistor 44 conducts.

When ignition switch 11 is closed, a positive voltage will appear at the emitter of transistor 26, holding the transistor cut off. When the ignition switch 11 is open and the light switch 12 is closed, the positive cut off voltage will be overcome by a larger voltage on the base and transistor 26 will be forward biased to produce an audible tone warning in speaker 31. This occurs because when ignition switch 11 is open and oil pressure switch 15 closes, the voltage divider biasing circuit is completed from battery 13 through light switch 12, and resistors 42, 43, 21 and 22. Transistor 44 is, accordingly, forward biased and a positive potential is applied to the base of transistor 26 through diodes 45 and 47 and resistor 46. When ignition switch 11 is closed, resistor 43 is returned to the battery 13 so that there is no voltage drop through resistor 42.

The system of FIG. 1 also has provision for producing an audible warning to the operator of the vehicle, after a given length of time, that his turn signal has been left on. The turn indicator lights are represented by bulb pairs 51 and 52. These pairs are connected through a turn switch 53, a flasher unit 54 and a resistor 55, to the ignition switch 11. When switch 53 is moved to either the left or right position to illuminate a desired one of bulb pairs 51 and 52, the contacts of flasher unit 54 intermittently close as is well known in the art. This of course assumes that ignition switch 11 is closed. The result is that the appropriate one of bulb pairs 51 and 52 will be intermittently energized to indicate the turn direction.

The transistor 56 has its base connected to the juncture between flasher unit 54 and resistor 55, and has its emitter connected to the ignition switch 11. The collector of transistor 56 is connected through a pair of resistors 57 and 58 to ground or a reference potential. The juncture between resistor 22 and oil pressure switch 15 is connected through a resistor 61 and a resistor 62 to the emitter of transistor 26. Thus when the ignition switch 11 is closed, transistor 26 will be cut off until a larger voltage appears at its base. Such larger voltage occurs, as previously described, when the oil pressure falls below a given level or when the ignition switch is open and the light switch is closed. Battery potential is applied to the collector of transistor 26 through the center tapped primary of transformer 32 by diode 59 and filter network 60. Diode 59 blocks potential from flasher 54 when ignition switch 11 is open.

The juncture between resistors 57 and 58 is connected to the base of transistor 26 through diode 63 and resistor 64. The juncture between diode 63 and resistor 64 is grounded through a capacitor 65. A resistor 66 connects the junction between resistors 61 and 62 to the junction between resistor 64 and diode 63. The result of such a connection is that resistors 62, 64 and 66, together with capacitor 65, form a resistance-capacitance energy storage network. When transistor 56 is first rendered conductive by the closure of turn indicator switch 53, capacitor 65 presents an initially low impedance to current flow through resistor 66. Thus the voltage on the base of transistor 26 will be delayed in building up to a value sufficient to overcome the emitter voltage until capacitor 65 has charged to a sufficient potential. Values for the various components are selected such as to provide a sufficient delay as to enable the operator to make his turn, but to provide timely warning if the operator has forgotten to turn off the turn indicator switch and it has not returned automatically.

Referring now to FIG. 2, a simplified system in accordance with the invention is shown schematically. Similar components with similar functions to those in FIG. 1 have been given identical numerals. It will be noted that in FIG. 2, the center tap of the primary winding of transformer 32 is grounded and the output transistor 71 is a PNP transistor. Capacitors 72 and 73 are tuned with the primary winding of transformer 32 and form an oscillatory regenerative circuit for transistor 71 at an audio frequency. Thus, conduction of transistor 71 will cause oscillations which are reproduced as audible warning signals in speaker 31.

The base of transistor 71 is connected to ground through resistor 74, resistor 75, diode 76 and oil pressure switch 15. The emitter of transistor 71 is connected to battery 13 through ignition switch 11, resistors 55 and 77 and diode 78. A filter capacitor 79 grounds the juncture between resistor 77 and diode 78. It will be seen, therefore, that with ignition switch 11 closed, closure of oil pressure switch 15 in response to the oil pressure falling below a given level will produce emitter to base current flow in transistor 71, biasing the transistor into conduction and producing the warning tone.

The system of FIG. 2 also gives audible warning that the light switch 12 has been left on with the ignition switch 11 open. As was the case in the system of FIG. 1, oil pressure switch 15 closes when ignition switch 11 is open. Under such circumstances, if light switch 12 is closed the emitter of transistor 71 is connected to the battery through switch 12 and diode 80. The base of transistor 71 is grounded through oil pressure switch 15 as set forth above, so that emitter to base current flow will result in transistor 71 biasing the same into conduction to produce an audible tone warning.

The juncture between turn switch 53 and flasher unit 54 is coupled to the base of transistor 71 through resistor 81 and resistor 74. Thus, closure of turn switch 53 to either the left or right positions completes an emitter to base current path for transistor 71, causing forward biasing of the transistor and audible warning to the operator of the vehicle that the turn indicator switch is on.

It may therefore be seen that the system of the invention provides audible warning that the turn indicator is on, that the oil pressure has fallen below a given level, and that the headlights are left on with the ignition switch open. Audible warnings are generally more effective in gaining the operator's attention than are the more traditional visual warnings. This aids in safer driving and in reducing the danger of a defective condition going unnoticed. The operation is entirely automatic and incorporates inexpensive units and few components. Furthermore, such systems may be readily incorporated in existing electrical systems of vehicles.

We claim:

1. In a vehicular electrical system having an ignition switch and a light switch each connected to a source of potential, a normally open oil pressure switch operable to a closed position in response to the vehicle oil pressure falling below the given level, and further having a turn indicator switch, a warning system for providing an audible warning when the vehicle oil pressure falls below a given level, when the ignition switch is open with the light switch closed, and when the turn indicator switch has been closed for a given length of time, said warning system including in combination, transistor means, audible warning means connected to said transistor means to be energized thereby when said transistor means are conductive, a first bias circuit and means connecting the same to said transistor means for rendering said transistor means conductive upon the application of current to said first bias circuit, energizing circuit means for connecting said first bias circuit in series with the oil pressure switch and each of the ignition switch and the light switch across a source of potential, said circuit means applying current to said first bias circuit when the oil pressure switch is closed and either of the ignition switch and the light switch is closed, a second bias circuit and means connecting the same in series with the turn indicator switch across the source of potential, means connecting said second bias circuit to said transistor means for rendering the same conductive when the turn indicator switch and the ignition switch are both closed, and energy storage means connected to said second bias circuit and providing a time delay before said transistor means is rendered conductive.

2. The combination of claim 1 wherein said energy storage means comprises a resistor-capacitor network.

3. In a vehicular electrical system having an ignition switch and a light switch each connected to a source of potential, and a normally open oil pressure switch operable to a closed position in response to the vehicle oil pressure falling below the given level, a warning system for providing an audible warning when the vehicle oil pressure falls below a given level and when the ignition switch is open with the light switch closed, said warning system including in combination, a voltage divider network having first and second portions, said first and second portions being connected in series with each other and the light switch and the oil pressure switch across the source of potential, said second portion being connected in series with said ignition switch and the oil pressure switch across the source of potential, a first transistor having input electrodes connected across a segment of said first portion to be forward biased upon energization thereof, a second transistor having input electrodes connected across a segment of said second portion to be forward biased upon energization thereof, and audible warning means connected to said first and second transistors to be energized thereby when one of said first and second transistors is forward biased due to respective energization of said first and second portions of said voltage divider.

4. In a vehicular electrical system having an ignition switch and a light switch each connected to a source of potential, a normally open oil pressure switch operable to a closed position in response to the vehicle oil pressure falling below the given level, and further having a turn indicator switch, a warning system for providing an audible warning when the vehicle oil pressure falls below a given level, when the ignition switch is open with the light switch closed, and when the turn indicator switch has been closed for a given length of time, said warning system including in combination, a voltage divider network having first and second portions, said first and second portions being connected in series with each other and the light switch and the oil pressure switch across the source of potential, said second portion being connected in series with said ignition switch and the oil pressure switch across the source of potential, a first transistor connected across a segment of said first portion to be forward biased upon energization thereof, a second transistor connected across a segment of said second portion to be forward biased upon energization thereof, and audible warning means connected to said first and second transistors to be energized thereby when either of said first and second transistors are forward biased due to energization of said respective first and second portions of said voltage divider, a resistor series connected with the turn indicator switch and the ignition switch across the source of potential, a third transistor connected across said resistor to be forward biased thereby when the ignition switch and the turn switch are closed, and a resistance-capacitance energy storage network connected to the output of said third transistor to delay the application of energy therefrom to said warning means for the given length of time.

5. In a vehicular electrical system having an ignition switch and a light switch, each connected to a source of potential, a normally open oil pressure switch operable to a closed position in response to the vehicle oil pressure falling below the given level, and further having a turn indicator switch, a warning system for providing an audible warning when the vehicle oil pressure falls below a given level, when the ignition switch is open with the light switch closed, and when the turn switch has been closed for a given length of time, said warning system including in combination, a transistor, audible warning means connected to said transistor to be energized thereby when said transistor is conductive, a bias circuit series connected with said transistor for rendering said transistor conductive upon energization of said bias circuit, said bias circuit including a first portion series connected with the ignition switch and the oil pressure switch across the source of potential and a second portion series connected with the light switch and the oil pressure switch across the source of potential, said bias circuit being energized to render said transistor conductive when the oil pressure switch is closed and either of the ignition switch and the light switch is closed, and a resistor series connected with the turn indicator switch and the bias circuit across the source of potential to render said transistor conductive when the ignition switch is closed and the oil pressure switch is open and the turn indicator switch is closed.

6. In a vehicular electrical system having an ignition switch and a turn indicator switch, a warning system for providing an audible warning when the turn indicator switch is closed for a given length of time with the ignition switch closed, said warning system including in combination, a resistor series connected with the ignition switch and the turn indicator switch across a source of potential, a transistor connected across said resistor to be forward biased thereby when the ignition switch and the turn indicator switch are both closed, audible warning means connected to said transistor to be energized thereby when said transistor is forward biased, and a resistance-capacitance energy storage network connected between said transistor and said warning means and providing a time delay of the given period before said audible warning means is energized.

7. In a vehicular electrical system having an ignition switch and a light switch each connected to potential supply means, and an oil pressure switch which is open when the vehicle oil pressure is above a given level and which is closed in response to the oil pressure falling below the given level, a warning system for providing an audible warning when the vehicle oil pressure falls below the given level and when the ignition switch is open with the light switch closed, said warning system including in combination, transistor means, audible warning means connected to said transistor means to be energized thereby in response to conduction of said transistor means, and a bias circuit including resistor means connected to said transistor means for rendering said transistor means conductive in response to a predetermined voltage across said resistor means, said bias circuit including circuit means connecting said resistor means in series with said oil pressure switch to the ignition switch and the light switch for connection thereby to the potential supply means, said bias circuit providing current flow through said resistor means in response to closing of said oil pressure switch and one of the ignition switch and the light switch to provide a bias voltage across said resistor means for rendering said transistor means conductive.

8. In a vehicular electrical system having an ignition switch and a light switch each connected to potential supply means, an oil pressure switch which is open when the vehicle oil pressure is above a given level and which is closed in response to the oil pressure falling below the given level, and turn indicator apparatus including a switch for actuating the same, a warning system for providing an audible warning when the vehicle oil pressure falls below the given level, when the ignition switch is open with the light switch closed and when the turn indicator switch is closed, said warning system including in combination, transistor means, audible warning means connected to said transistor means to be energized thereby in response to conduction of said transistor means, a first bias circuit including resistor means connected to said transistor means for rendering said transistor means conductive in response to a predetermined voltage across said resistor means, said first bias circuit including circuit means connecting said resistor means in series with said oil pressure switch to the ignition switch and the light switch to provide current flow through said resistor means in response to closing of said oil pressure switch and one of the ignition switch and the light switch to provide a voltage across said resistor means for rendering said transistor means conductive, and a second bias circuit connected to the turn indicator switch and the ignition switch and to said transistor means to apply a bias voltage to said transistor means to cause the same to conduct in response to closing of the ignition switch and the turn indicator switch.

9. In a vehicular electrical system having an ignition switch connected to a source of potential, and further having a turn indicator switch, a warning system for providing an audible warning when the turn indicator switch is closed for a given length of time, said warning system including in combination, a first resistor series connected between the ignition switch and the turn indicator switch across a source of potential, a PNP transistor having base, emitter and collector regions, said base and emitter regions being connected across said resistor for forward biasing said transistor in response to current flow through said resistor resulting from closing of the turn indicator switch, resistance means connecting the emitter and collector regions of said PNP transistor across the source of potential, so that a voltage is developed across said resistance mean in response to conduction of said PNP transistor, an NPN transistor having base, emitter and collector regions, means coupled to said NPN transistor to render the same oscillatory and to provide an audible output in accordance with the frequency of oscillation, a second resistor and a diode connected in series between the base of said NPN transistor and said resistance means, and a capacitor connecting the juncture between said second resistor and said diode to a reference potential, means for applying a potential to said capacitor for charging the same to provide a voltage to the base of said NPN transistor to forward bias the same for conduction, said diode providing a discharge path for said capacitor when the turn indicator switch is opened, said diode being rendered non-conducting by the voltage across said resistance means when the turn indicator switch is closed so that said capacitor charges to forward bias said NPN transistor, said capacitor providing storage of energy when the turn indicator switch is first closed to delay forward biasing of said NPN transistor for the given length of time.

References Cited

UNITED STATES PATENTS

| | | | |
|---|---|---|---|
| 3,214,730 | 10/1965 | Prewitt | 340—52 |
| 3,283,299 | 11/1966 | Savino | 340—384 |

JOHN W. CALDWELL, *Primary Examiner.*

NEIL C. READ, *Examiner.*

A. H. WARING, *Assistant Examiner.*